No. 794,672. PATENTED JULY 11, 1905.
W. GUTWASSER.
WOOD FLOOR OR WALL COVERING.
APPLICATION FILED JULY 5, 1904.

No. 794,672. Patented July 11, 1905.

UNITED STATES PATENT OFFICE.

WILHELM GUTWASSER, OF KÖNIGSBERG, GERMANY, ASSIGNOR OF ONE-HALF TO OSWALD MESS, OF ANTWERP, BELGIUM.

WOOD FLOOR OR WALL COVERING.

SPECIFICATION forming part of Letters Patent No. 794,672, dated July 11, 1905.

Application filed July 5, 1904. Serial No. 215,359.

*To all whom it may concern:*

Be it known that I, WILHELM GUTWASSER, a citizen of the Empire of Germany, residing in Königsberg, Province of East Prussia, in the Empire of Germany, have invented certain new and useful Improvements in Wood Floor or Wall Coverings, of which the following is a specification.

This invention relates to an improved wood covering which can be used for covering floors, walls, ceilings, panels, and the like and which can be laid in small pieces or blocks in any desired design in a manner similar to the marble mosaic, so as to be used in place of the more expensive parquet-flooring and other wooden floor and wall coverings; and for this purpose the invention consists of a floor and wall covering which comprises a suitable foundation, a superposed layer of an oil-containing cement composition, and a surface layer of small wooden blocks united to the intermediate layer and to each other by a similar cement composition, the wooden blocks forming the surface layer being rendered waterproof, so as to be moisture resistant.

The invention consists, further, of a floor or wall covering comprising a suitable foundation or backing, a netting attached to the same, a superposed layer of an oil-containing cement composition spread over said netting, and a face layer of waterproofed wooden blocks laid thereon and united with the intermediate layer of cement composition and with each other by a similar cement composition.

The invention consists, lastly, of certain additional details of construction, which will be fully described hereinafter and finally pointed out in the claims.

Figure 1:
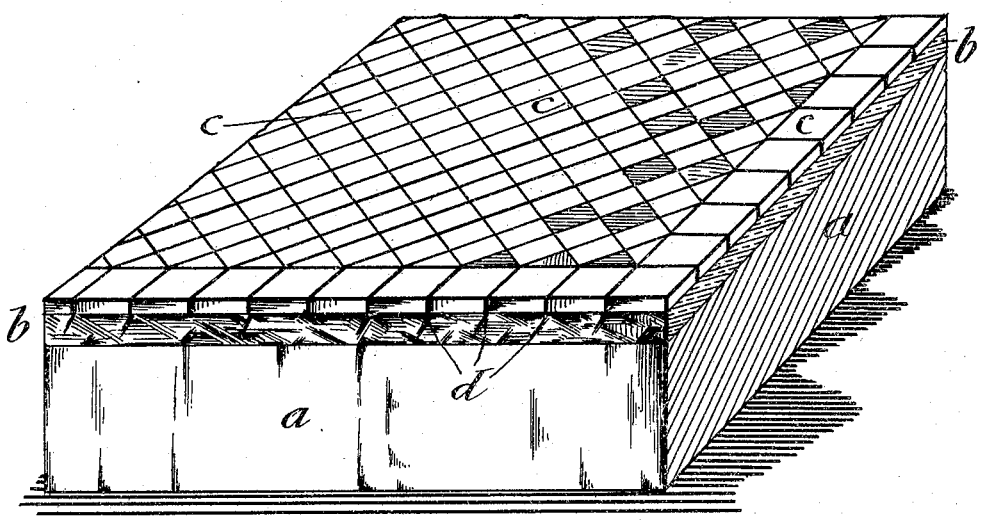
Figure 2:
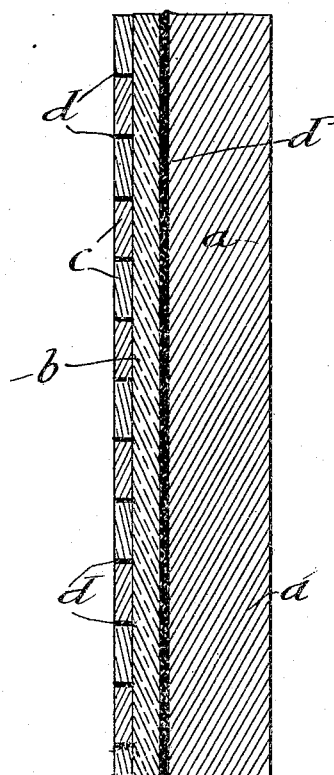
Figure 3:
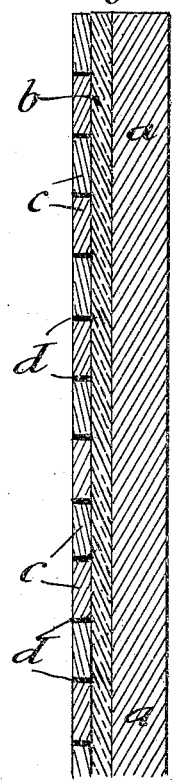

In the accompanying drawings, Figure 1 represents a perspective view of my improved wood covering, shown as used for a floor-covering; and Figs. 2 and 3 are vertical transverse sections, showing the wood covering applied as a wall-covering and as a panel for furniture.

Similar letters of reference indicate corresponding parts.

Referring to the drawings, *a* represents a foundation, *b* a superposed layer of oil-containing cement composition, and *c* a layer of small wooden pieces or blocks, which are cemented to the intermediate layer *b* and to each other by a suitable wood-cement *d*. The foundation *a* is made in the case of floors of any suitable material, such as wood, stone, concrete, or other material. When the covering is used for walls and ceilings, the ordinary plaster coating forms the foundation. When the covering is used for furniture, wooden, metallic, or other panels serve as a foundation. The superposed layer *b* of cement composition is spread over the foundation *a* when a floor-covering is to be made, or in the case of a wall or ceiling covering the cement composition is spread on a netting *d'* of wire, rattan, or other material, which is attached to the wall or ceiling, the layer of cement composition being supported by said netting, as shown in Fig. 2.

The composition used for the intermediate layer *b* consists of the well-known glazier's cement, to which a suitable filling material is added, so as to render the same more compact. The filling material may be ground bricks and sawdust or sand and grit. A suitable animal or vegetable fiber is mixed with the cement composition, so as to render the intermediate layer more elastic and prevent the formation of cracks under pressure. The glazier's cement itself is composed of pulverized chalk, linseed varnish, silver litharge, which is employed as a drier and to make the cement harder, and a small quantity of copal varnish. Any other cement composition may be employed provided that it furnishes the same advantages—namely, the preservation of the small wooden blocks laid on the same and the waterproofing of said blocks by the absorption of the oil contained in the cement composition. The blocks may also be made directly waterproof by saturating the same with a suitable oil, such as paraffin or other hydrocarbon oil, before being laid, which protects the blocks against moisture and prevents them from warping or otherwise changing their form. The blocks are united with the cement composition *d* by spreading over the bottom and sides of the blocks putty or other wood-cement, which holds them tightly in place on the intermediate layer of cement composition, as the wood-cement spread over the blocks unites with the kindred cement composition and holds the blocks firmly in place thereon. The wooden blocks are produced by cutting the wood into the proper shape by means of a saw without any attempt at finishing the same and are laid directly on the intermediate layer of cement composition. As the blocks are surrounded by the waterproof cement and supported on a waterproof cement composition, they are protected against moisture and retain their form and shape for a considerable length of time.

In case larger ornaments are to be used in the floor they are cemented together in the shop and then laid down in a large piece on the intermediate layer by spreading wood-cement over the bottom of the ornamental piece. The individual blocks and larger ornaments adhere firmly to the cement composition even if the same has been laid for some time, as the wood-cement used on the bottom and joints of the wood blocks unites intimately with the cement composition of the supporting layer even if the latter is in a perfectly dry state.

When the wood-mosaic covering is applied to walls and ceilings, the intermediate layer is spread over the netting attached to the plaster covering of the wall or ceiling, after which the wooden pieces or blocks are cemented on the intermediate layer and to each other in the same manner as when laying a floor-covering. In the same manner the panels for furniture are made by applying the intermediate layer of cement composition to a foundation of wood, sheet metal, or other suitable material.

The advantages of my improved wood-mosaic covering for floors, walls, &c., are, besides its waterproof quality, the facility and comparative cheapness by which the same can be laid, especially as compared with parquet-flooring. The wood-mosaic covering can be varnished and cleaned with great facility. It can be easily repaired in case any one of the blocks should become loose, warped, or broken by removing the injured blocks and replacing them by new blocks united with the intermediate layer and the adjacent blocks by cement. The covering has the advantage of being permanent and waterproof. The wood-mosaic covering can be made in any desired colors and designs in the same manner as marble-mosaic. Its advantages over parquet-flooring is its cheapness and the facility with which it can be laid down without requiring any special fitting of the wooden blocks. When the wood-mosaic is used for upright walls or panels to which the intermediate layer of cement can adhere directly, the intermediate layer of netting can be dispensed with, as the adhesive property of the wood-cement forms then a sufficient support for the blocks.

Having thus described my invention, I claim as new and desire to secure by Letters Patent—

1. A floor or wall covering, comprising a foundation of suitable material, an intermediate layer of oil-containing cement, wooden blocks laid thereon, and a suitable wood-cement interposed between the sides of the blocks and between the bottoms of the same and said intermediate layer for uniting said blocks with each other and with the latter.

2. A floor or wall covering, comprising a foundation of suitable material, an intermediate layer of an oil-containing cement embodying a suitable filler, a surface layer of waterproofed wooden blocks, and a suitable wood-cement interposed between the sides of the blocks and between the bottoms of the same and said intermediate layer for uniting said blocks with each other and with the latter.

3. A floor or wall covering, comprising a foundation or backing, a superposed layer of wire-netting, a layer of oil-containing cement spread over said netting, a surface layer of wooden blocks laid on said cement layer, and a suitable wood-cement interposed between the sides of the blocks and between the bottoms of the same and the layer of oil-containing cement.

In testimony that I claim the foregoing as my invention I have signed my name in presence of two subscribing witnesses.

WILHELM GUTWASSER.

Witnesses:
  M. HANNKE,
  A. BUSCKE.